3,251,766
SEPARATION PROCESSES
Clive Leonard Hicks and Roger Templeton Lewis Mowll, Sunbury-on-Thames, England, assignors to The British Petroleum Company Limited of Britannic House, London, England, a British joint-stock corporation
Filed Feb. 19, 1963, Ser. No. 259,665
Claims priority, application Great Britain, Feb. 21, 1962, 6,719/62
11 Claims. (Cl. 208—310)

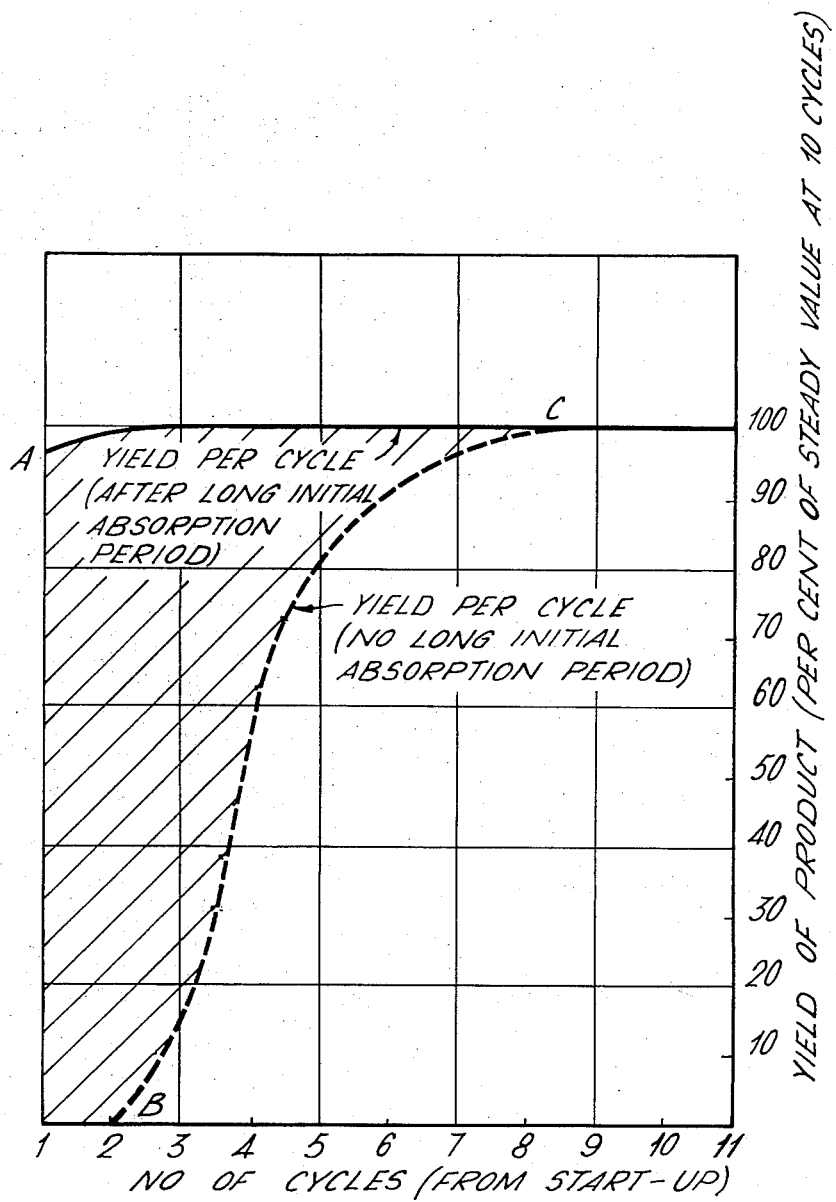

This invention relates to hydrocarbon separation processes using molecular sieves and particularly to processes for the separation of straight-chain hydrocarbons from branched-chains and/or cyclic hydrocarbons.

It is well know that certain natural and synthetic zeolites have the property of preferentially absorbing certain types of hydrocarbons. These veolites known as molecular sieves, have crystalline structures containing a large number of pores of uniform size. In different zeolites these pores may vary from 4 A. to 15 A. or more in diameter, but in any one zeolite the pores will be of substantially uniform size.

It has previously been proposed to treat hydrocarbon mixtures with molecular sieves. It has been proposed to treat petroleum fractions ranging from gasoline to gasoils and higher with molecular sieves having pore diameters ranging from 4 A. to 15 A. In order to separate straight-chain hydrocarbons from branched-chain and/or cyclic hydrocarbons a molecular sieve having pore diameters of 5 A. is suitable. Such a process may be used to recover a denormalised fraction, for example gasoline of higher octane number due to the removal of low octane normal paraffins. The absorbed straight-chain material may also be recovered if desired.

In certain circumstances it may be desirable, when operating a molecular sieve process comprising successive absorption and desorption stages, with or without an intervening purge stage, to make each desorption a partial one. In such a process it will be appreciated that the amount of material absorbed and desorbed per cycle is less than the total absorptive capacity of the sieve. As a result, it has been found that when starting with a sieve containing no absorbed material some time elapses before the process settles down to normal operation.

According to the present invention, in a cyclic process for the separation of straight-chain hydrocarbons from mixtures containing them by means of a 5 A. molecular sieve comprising alternate absorption and partial desorption stages, fresh or regenerated sieve containing no absorbed hydrocarbons is subjected to a longer absorption period than the period used for the subsequent absorptions.

By the use of a longer absorption period when the feed is contacting fresh or regenerated sieve, the sieve becomes saturated with hydrocarbons more rapidly and the process thus reaches normal operation more rapidly. Preferably the longer absorption period is of such duration that the sieve is fully saturated under the operating conditions employed before it is submitted to its first desorption. This period is generally between 2 and 10 times the period of the normal absorptions. This total absorptive capacity of the sieve under the operating conditions employed can readily be determined by experiment by passing into a bed of sieve the feedstock under the normal process conditions until the effluent has the same composition as the feedstock and then determining the quantity of hydrocarbons absorbed.

Due to the heat of absorption that is developed during the long initial absorption period it is preferable to commence this operation at a temperature 20–30° C. lower than the usual process temperature. In this way the heat of absorption may be used advantageously to bring the sieve bed up to the operating temperature. If the sieve bed were at the usual process temperature initially then the heat of absorption developed might raise the temperature of the sieve bed to a level at which cracking of the feedstock would occur and harmful deposits of cracked material might be left on the sieve bed.

When using a single bed of sieve which is alternatively absorbed and desorbed, the use of a longer initial absorption period involves no modification of the other stages of the process and any convenient length of initial absorption period may be used. When operating a continuous process with two or more beds of sieve, one or more being on absorption and one or more being on desorption at any given time, it is necessary to relate the length of the absorption and desorption periods, and with this type of process the longer initial absorption period may have to be followed by an equivalent longer desorption period which will offset, to a certain extent, the benefit of the longer absorption period. However, since absorption is more rapid than desorption, the use of the process of the present invention will still be beneficial and the time taken to reach normal operation will be reduced as compared with a process starting up with a short absorption period. If desired with this type of process a longer absorption period may be used for the second cycle as well as the first. When, however, a continuous multi-bed process includes a spare bed so that beds can be regenerated in turn without shutting down the plant, the longer initial absorption period can be given to the regenerated bed without altering the normal operating cycle of the beds still on stream. This type of process may conveniently be combined with the process described in U.K. Patent No. 965,008, in which the sieve is subjected immediately before each regeneration operation, to a long desorption period sufficient to remove at least a portion of the material which is not removed from the sieve during the normal desorption stages.

The present invention is particularly applicable when the separation process is primarily directed to the recovery of the sorbed hydrocarbons, since the effect of starting up a bed of fresh or regenerated sieve without a longer initial absorption period is principally to reduce the yield of sorbed hydrocarbons during the initial cycles.

This lower yield can also adversely affect the purity of the product, if, as is likely, the quantity of impurities passing into the product is not lowered proportionately with the total yield of product, and the process is thus further particularly applicable to processes for the recovery of sorbed hydrocarbons with a purity of at least 90% wt., and preferably at least 95% wt. A purge stage is preferably added between the absorption and desorption stages in such a process, the purge gas being preferably an inert gas, for example nitrogen. According to a preferred embodiment the inert gas is also passed with the feedstock during the absorption stage.

The process is particularly suitable for the separation of straight chain hydrocarbons from petroleum fractions. The process is more particularly applicable to the separation of longer straight chain hydrocarbons, for example $C_{10}$ or higher normal paraffins. Particularly preferred feedstocks are gas oil fractions, i.e. thus boiling between 150 and 400° C.

The process conditions may be varied within wide limits depending on the feedstocks used, but with the preferred gas oil feedstock, the following general ranges of conditions are suitable for the absorption:

Temperature __ 300–400° C.
Pressure _____ 50–300 p.s.i.g.
Space velocity _ 0.1–5 liquid hourly space velocity.
Inert gas rate __ 10–500 gas liquid hourly space velocity.

The purge and desorption stages are preferably iso-baric and isothermal with the absorption stage and the purge gas rate may be from 10 to 500 GHSV. Desorption is preferably carried out with a normal paraffin of lower boiling point than the lowest-boiling normal paraffin in the feedstock.

The invention is illustrated by the following example.

*Example*

A gas oil containing 0.01% wt. of sulphur was passed over a bed of 5 A. molecular sieve under the following conditions:

| Stage | Feed | Temp., °C. | Pressure, p.s.i.g. | Rates | Duration, min. |
|---|---|---|---|---|---|
| Absorption | 220–340° C. Gas Oil. Nitrogen | 380 | 125 | 0.7 LHSV 120 GHSV | 6 |
| Purge | Nitrogen | | | 120 GHSV | 6 |
| Desorption | n-Pentane | | | 1.0 LHSV | 12 |

In one experiment the sieve bed was first heated to 350° C. and then absorption commenced and continued until the sieve bed was saturated with n-paraffins and the temperature had risen to 380° C. The process cycle as shown above was then commenced. In a second experiment the sieve bed was first heated to 380° C. and the process cycle was then commenced.

FIGURE 1 illustrates the results obtained. The different yield curves that result from the use, or failure to use, a long initial absorption period are shown. It can readily be seen that the yield of product per cycle after an initial long absorption period reaches the steady level immediately, within the limits of normal experimental variation. However, when a long initial absorption period is not used the yield of product per cycle is very low for several cycles due to the partial desorption method used for the process. The shaded area ABC represents the increase in yield due to the use of the longer initial absorption period.

We claim:

1. A cyclic process for the separation of straight-chain hydrocarbons from mixtures containing them by means of a 5 A. molecular sieve, comprising alternate absorption and partial desorption stages, wherein fresh or regenerated sieve containing no absorbed hydrocarbons is subjected to an initial absorption period between 2 and 10 times that employed in subsequent absorption periods, such succeeding absorption periods being of the same duration as each other.

2. A process as claimed in claim 1 wherein the longer initial absorption period is operated at a temperature between 20 and 30° C. below that of the subsequent absorption periods.

3. A process as claimed in claim 1 wherein a number of beds of sieve are employed and wherein a spare bed is included to enable each bed to be regenerated in turn without discontinuing the operation of the other beds and wherein the longer initial absorption period is applied to the regenerated bed without altering the normal operating cycle of the beds still on stream.

4. A process as claimed in claim 3 wherein immediately before regeneration the sieve bed concerned is subjected to a long desorption period sufficient to remove at least a proportion of the material which is not removed from the sieve during the normal desorption stages.

5. A process as claimed in claim 1 wherein a purge state is interposed between the absorption and desorption stages and the straight-chain hydrocarbons are recovered in a purity of at least 90% weight preferably at least 95% weight.

6. A process as claimed in claim 7 wherein the purging medium employed is an inert gas, preferably nitrogen.

7. A process as claimed in claim 6 wherein the inert gas is also passed with the feedstock to the absorption stage.

8. A process as claimed in claim 1 for the separation of straight-chain hydrocarbons form petroleum fractions boiling within the range 150 to 400° C.

9. A process as claimed in claim 8 wherein the absorption stage is operated at a temperature within the range 300–400° C., a pressure within the range 50–300 p.s.i.g., a space velocity within the range 0.1–5 v./v./hr. and an inert gas flow rate within the range 10–500 gaseous v./v./hr.

10. A process as claimed in claim 9 wherein the purge and desorption stages are isobaric and isothermal with the absorption stage and purge gas rate is within the range 10–500 gaseous v./v./hr.

11. A process as claimed in claim 1 wherein the desorption is carried out with a normal paraffin of lower boiling point than the lowest boiling normal paraffin in the feedstock.

References Cited by the Examiner

UNITED STATES PATENTS 2,818,137  12/1957  Richmond et al. _____ 260—676
2,952,630  9/1960   Eggertsen et al. _____ 208—310

FOREIGN PATENTS 851,977  10/1960  Great Britain.

ALPHONSO D. SULLIVAN, *Primary Examiner.*

D. S. ABRAMS, *Assistant Examiner.*